(12) United States Patent
Cottingame et al.

(10) Patent No.: US 7,710,639 B2
(45) Date of Patent: May 4, 2010

(54) SYSTEM AND METHOD FOR UNIFORM ILLUMINATION OF A TARGET AREA

(75) Inventors: William Bryan Cottingame, Newbury Park, CA (US); Robert Rex Rice, Simi Valley, CA (US); Martin Richard Flannery, Santa Monica, CA (US)

(73) Assignee: Northrop Grumman Space & Mission Systems Corporation, Los Angeles, CA (US)

( * ) Notice: Subject to any disclaimer, the term of this patent is extended or adjusted under 35 U.S.C. 154(b) by 270 days.

(21) Appl. No.: 11/637,262

(22) Filed: Dec. 12, 2006

(65) Prior Publication Data
US 2009/0262415 A1   Oct. 22, 2009

(51) Int. Cl.
 *H04B 10/17* (2006.01)
 *H01S 3/00* (2006.01)
(52) U.S. Cl. ............................................. 359/349
(58) Field of Classification Search .................. 359/349
See application file for complete search history.

(56) References Cited

U.S. PATENT DOCUMENTS

| | | | | |
|---|---|---|---|---|
| 4,523,809 A | * | 6/1985 | Taboada et al. | 359/577 |
| 5,694,408 A | * | 12/1997 | Bott et al. | 372/6 |
| 5,715,270 A | * | 2/1998 | Zediker et al. | 372/75 |
| 5,864,430 A | * | 1/1999 | Dickey et al. | 359/559 |
| 5,946,130 A | | 8/1999 | Rice | |
| 6,200,309 B1 | * | 3/2001 | Rice et al. | 606/10 |
| 6,245,590 B1 | * | 6/2001 | Wine et al. | 438/52 |
| 7,088,743 B2 | | 8/2006 | Rice et al. | |
| 2003/0150917 A1 | * | 8/2003 | Tsikos et al. | 235/454 |
| 2004/0057475 A1 | * | 3/2004 | Frankel et al. | 372/25 |

* cited by examiner

*Primary Examiner*—Eric Bolda
(74) *Attorney, Agent, or Firm*—Tarolli, Sundheim, Covell & Tummino LLP

(57) ABSTRACT

A system and method is provided for uniform illumination of a target area. In one embodiment, the system comprises a plurality of mutually incoherent light sources configured to generate respective light beams with different wavelengths, and transmitting optics configured to transmit the light beams with different wavelengths in a non-overlapping wavelength light beam pattern over the target area, such that there are no overlap regions of the target area illuminated by a light beam from the same light source.

20 Claims, 4 Drawing Sheets

SYSTEM AND METHOD FOR UNIFORM ILLUMINATION OF A TARGET AREA

TECHNICAL FIELD

The present invention relates generally to electronics, and more particularly to a system and method for uniform illumination of a target area.

BACKGROUND

In numerous applications such as laser tracking, laser guidance and laser imaging, it is desirable to produce a high power output laser beam to illuminate uniformly a large target area. Moreover, high power laser systems find applications in such diverse fields as offensive and defensive weapon systems, e.g., non-visible light illuminators for special operation forces, for example gunship camera illuminators, and civilian protective laser grids for high value assets, such as nuclear power plants and airports. In short, there are multiple military and commercial applications for high power laser sources to uniformly illuminate target areas. In the earliest laser systems, single flashlamp pumped solid state lasers were utilized to provide a source of laser output for illuminating extended target areas, but these were limited in the amount of power they could provide due to their structural limitations and limited efficiency, nor was the illumination of the target area sufficiently uniform for many purposes. Subsequently, arrays of semiconductor lasers have been utilized in which the beams from adjacent emitters of the array, in both 2D rack-and-stack configurations or spaced upon the same substrate, were coupled together in the same optical aperture to uniformly illuminate a target area. The illumination can be for various purposes, for example, rendering objects of interest visible in the illuminated area to a camera system or making range measurements to points on the illuminated surface by operating the laser in short pulses.

More recently, fiber optic power amplifiers have been employed to produce a high-power output signal. While a single fiber power amplifier will suffice for some low power applications, an array of optical fiber amplifiers collectively forming the fiber optic laser source can be employed in those specific applications when higher power output laser beams are required. Furthermore, the use of pulsed fiber lasers is highly desirable for space based 3-D imaging and target classification, the more so if the high efficiency, flexible waveform characteristics, beam quality and compact packaging of the fiber source can be maintained. Unfortunately, the pulse energy that can be achieved from a single fiber amplifier is not adequate for many important applications, thus requiring some method for combining the outputs from a multiplicity of fiber devices. While several approaches for scaling have been investigated, include spectral and coherent beam combining, all have potential problems for application requiring uniform illumination of a target area. For example, in an important Light Amplification for Detection and Ranging (LADAR) application, it is desired that an array of lasers transmit and scan time synchronized pulse beams at a same wavelength to uniformly cover an area in the far field and capture the return signals on a two-dimensional detector. However, interference can occur between beams at small regions of overlap potentially producing noise and degrading performance.

SUMMARY

In one aspect of the invention, a system is provided for uniform illumination of a target area. The system comprises a plurality of mutually incoherent light sources configured to generate respective light beams with different wavelengths, and transmitting optics configured to transmit the light beams with different wavelengths in a non-overlapping wavelength light beam pattern over the target area, such that there are no overlap regions of the target area illuminated by a light beam from the same light source.

In another aspect of the present invention, a system is provided for uniform illumination of a target area. The system comprises a plurality of means for generating respective light beams with different wavelengths, and means for transmitting the light beams with different wavelengths in a non-overlapping wavelength light beam pattern over the target area, such that there are no overlap regions of the target area illuminated by a light beam from the same light source.

In yet another aspect of the present invention, a method is provided for uniform illumination of a target area. The method comprises generating light beams with different wavelengths, and configuring the light beams in a non-overlapping wavelength light beam pattern in a near field. The method further comprises transmitting the light beams with different wavelengths in a non-overlapping wavelength light beam pattern over the target area in a far field, such that there are no overlap regions of the target area illuminated by a light beam from the same light source.

BRIEF DESCRIPTION OF THE DRAWINGS

FIG. 3 illustrates an exemplary checkered non-overlapping same wavelength light beam pattern employing four mutually incoherent different wavelength sources in accordance with an aspect of the present invention.

FIG. 4 illustrates an exemplary side-by-side non-overlapping wavelength light beam pattern employing two mutually incoherent sources in accordance with an aspect of the present invention.

FIG. 5 illustrates another exemplary side-by-side non-overlapping wavelength light beam pattern employing four mutually incoherent sources in accordance with an aspect of the present invention.

DETAILED DESCRIPTION

The present invention relates to a system and method for uniform illumination of a target area. The system and method employ a plurality of mutual incoherent light sources to scan a target area. The mutual incoherent light sources or emitters are configured to generate light beams with different non-overlapping wavelengths. The term mutually incoherent light beams is defined as light beams with wavelengths different from every other light beam in a given group of light beams. The term mutually coherent light beams is defined as light beams with the same wavelengths as light beams in a given group of light beams. Each light source can be provided to a fiber amplifier and packaged to transmit a non-overlapping wavelength light beam pattern on the target. Additionally, each light source can be provided to a group of fiber amplifiers and packaged to transmit a set of coherent light beams in a non-overlapping wavelength light beam pattern on the target, such that there are no overlap regions illuminated by a signal derived from the same light source.

The term non-overlapping wavelength light beam pattern is defined as a light beam pattern with each light beam having a wavelength that is different than any adjacent light beam in the light beam pattern. This can be effectively accomplished with various illumination patterns with as few as two sources illuminating, for example, a checkered or a side-by-side non-overlapping wavelength light beam pattern. The frequency separation of the independent sources should be sufficient to assure that intensity fluctuations are rapid with respect to the bandwidth of the receiver electronics (e.g., a beat frequency of 10 GHz for a 1 GHz detector bandwidth), so that no noise is effectively added at the overlap region.

In one aspect of the invention, the system and method can utilize multiple, mutually incoherent, master oscillators (MOs) to generate independent sets of fibers that are imaged on the target such that there are no overlap regions illuminated by a signal derived from the same MO. The illuminating pulses from the independent sources can be timed and the optical frequencies of each of the independent sources should fall within the bandwidth of the optical background filter, of the receiver, which may be of the order of an Angstrom unit or so at 1064 nm (e.g., 26 GHz).

Figure 1:
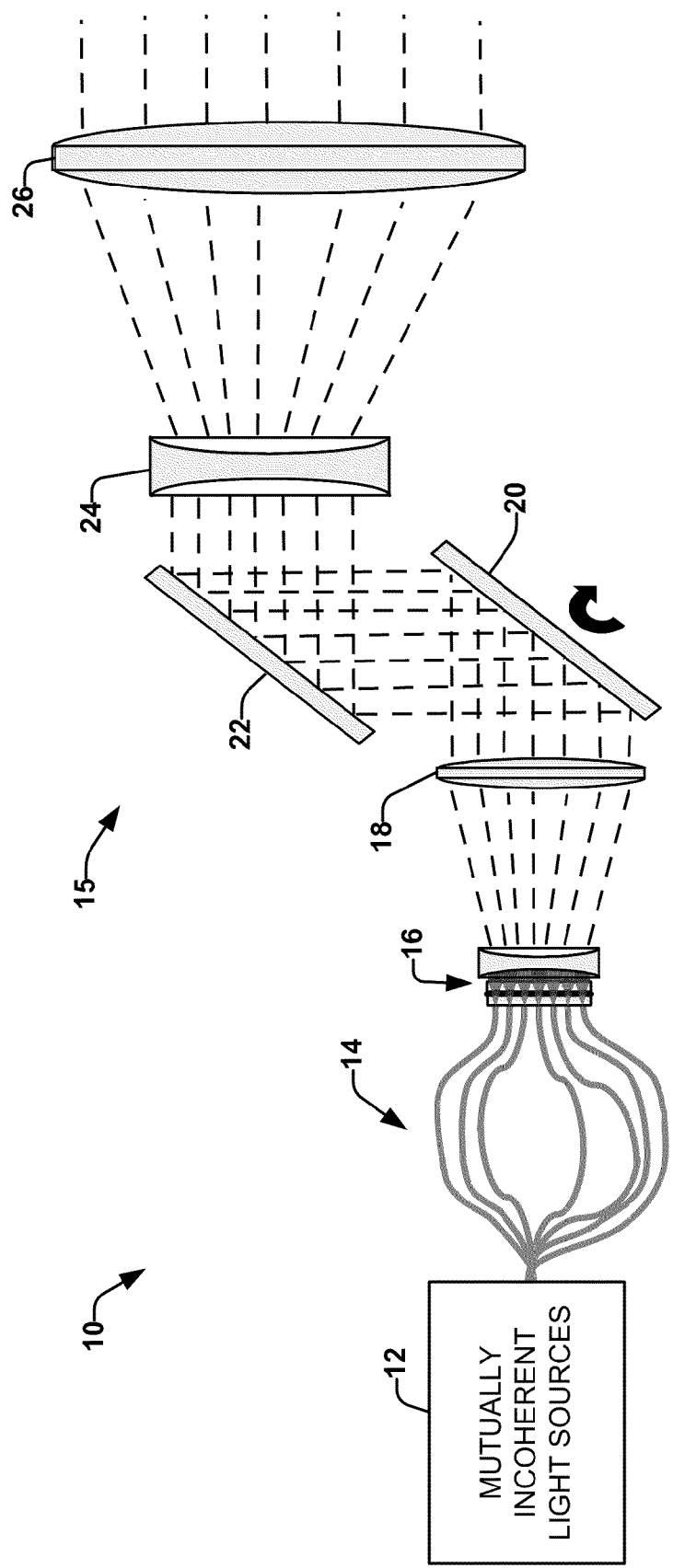
FIG. 1 illustrates a system for uniform illumination of a target area in accordance with an aspect of the present invention.

FIG. 1 illustrates a system 10 for uniform illumination of a target area in accordance with an aspect of the present invention. The system 10 can be employed in a far field LADAR application in which far field targets are illuminated and the return light signals are captured via receiving optics in the near field and focused on an image detector (e.g., charge coupled device (CCD)). The system 10 includes a plurality of mutually incoherent light sources 12. The plurality of mutually incoherent light sources 12 can be, for example, a plurality of laser sources configured to transmit a light beam, with each light beam transmitting at slightly different wavelengths or frequencies.

In one aspect of the invention, a plurality of mutually incoherent MOs each provide a time synchronized pulse that is amplified by a multiplicity of fiber amplifiers to provide a plurality of coherent sets of light beams, such that each set includes light beams that are mutually incoherent to light beams in other sets. Each high power laser beam is transmitted over a fiber of an array of transport fibers 14, which are then arrayed in the focal plane of a transmitting optics assembly 15, such that the near field distribution of the fiber array output is then imaged on the distant target (e.g., the ground from space or a high altitude platform).

The array of transport fibers 14 are aligned on an alignment and beam formatting optics assembly 16 to image a set of non-overlapping wavelength light beams on the target, such that there are no overlap regions illuminated by a signal derived from the same light source. The light beams are expanded, collimated and reformatted from Gaussian-like beams to substantially uniform rectangular beams by the alignment and beam formatting optics assembly 16 to produce a substantially fully filled near field, so that the near field images on the target are contiguous or overlap slightly to uniformly illuminate a patch at the target surface. The substantially uniform rectangular beams are transmitted through a beam expansion lens 18. A fast scan mirror 20 is employed to scan the substantially uniform rectangular beams over a target area, for example, in a whisk pattern via a mirror 22 and a pair of expansion lenses 24 and 26.

A receiving telescope (not shown) is configured to include optics for scanning the target area in a same manner as the fast scan mirror 20 to capture the return illumination pattern. The transmitting optics 15 of the system 10 can cover an area on the target much larger than the diffraction limited field of view of a receive telescope aperture (not shown) so that many ground sampling distance (GSD) areas are simultaneously illuminated. In this example, a 2-D focal plane detector array (e.g. a 128×256 element) can be used to collect the return signal from the entire illuminated spot and form a 2-D image. This 2-D (angle-angle) image can be converted to a 3-D image if the pulse arrival time is also measured for each pixel.

Figure 2:
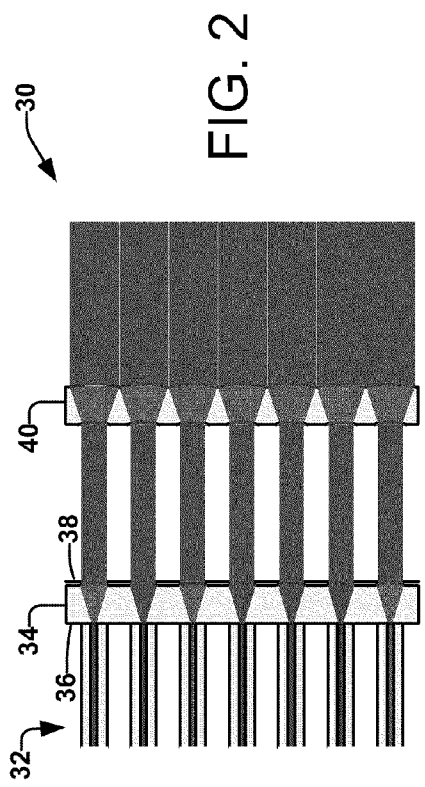
FIG. 2 illustrates an alignment and beam formatting optics assembly in accordance with an aspect of the present invention.

FIG. 2 illustrates an alignment and beam formatting optics assembly 30 in accordance with an aspect of the present invention. The alignment and beam formatting optics assembly 30 includes a collimation and spatial filter 34 that also functions as an alignment block. An array of transport fibers 32 are fused to an entrance surface 36 and expand according to the numerical aperture measurement (NA) of the fiber in a manner that provides for acceptable irradiances at an exit surface 38 of the alignment block. The array of transport fibers 32 are aligned on the entrance surface 36 to image a set of non-overlapping wavelength light beams on the target, such that there are no overlap regions illuminated by a signal derived from the same light source. The individual beams output at the transport fibers are collimated and apertured at the exit surface 38. The collimation and spatial filter 34 functions to remove Gaussian fallout at the edges of the light beam and pass the peak intensity at the center of the light beam. The light beams then are passed to a reformatting optics lens 40. The reformatting optics lens 40 functions to remap the circular Gaussian profile of the light beams to substantially near uniform rectangles that can approach 6th to 9th order Super Gaussians. The reformatting optics lens 40 can be, for example, aspheric lenses and/or grating, a phase mask or other structure that can perform the same function.

Figures 3, 4, 5:
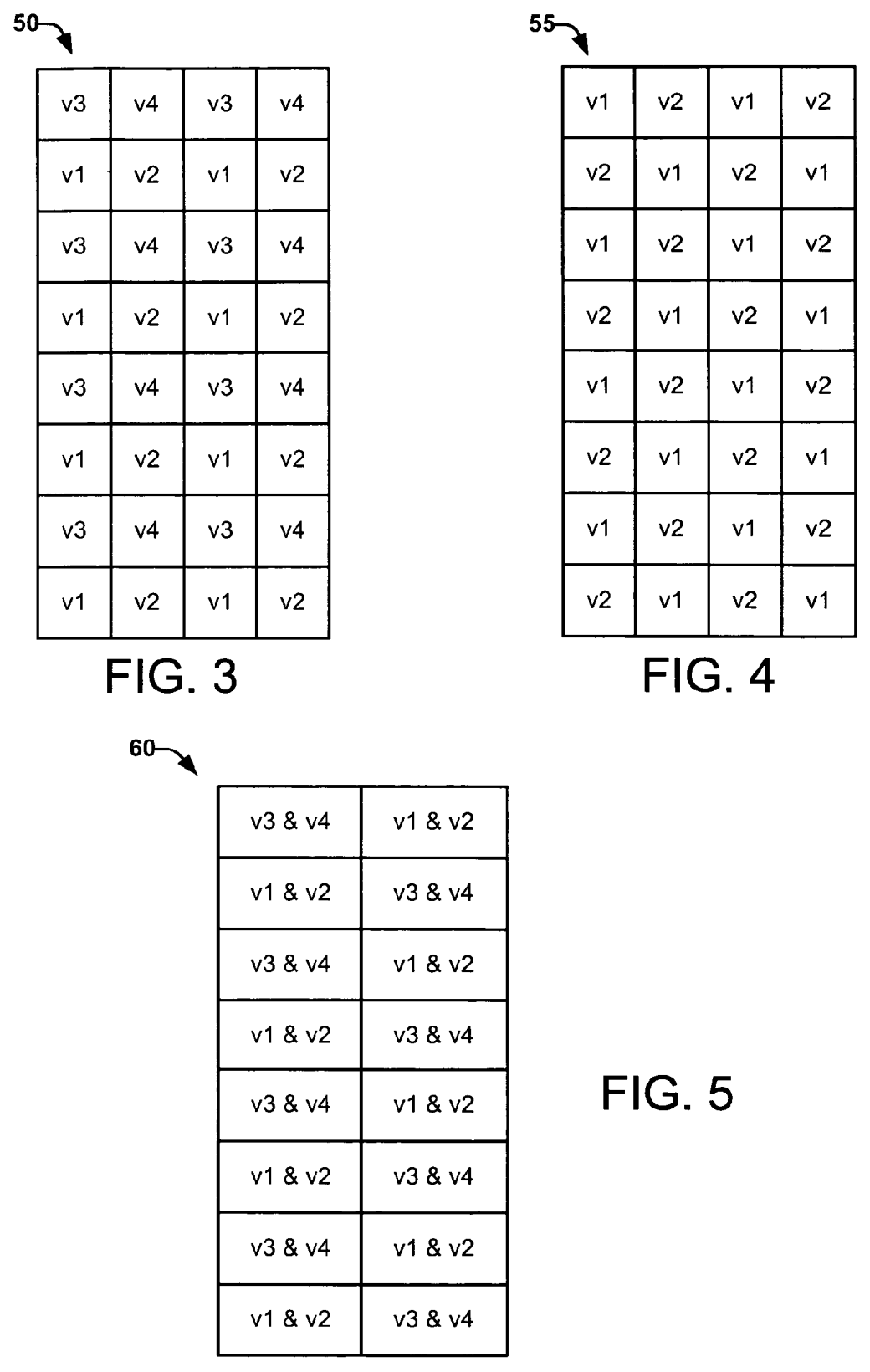

FIG. 3 illustrates an exemplary checkered non-overlapping wavelength light beam pattern 50 employing four mutually incoherent sources. Each mutually incoherent source provides a set of eight coherent light beams that are mutually incoherent with light beams in the other light beam sets. In the example of FIG. 3, the four mutually incoherent sources provide four different wavelength beams v1, v2, v3 and v4. The checkered non-overlapping wavelength light beam pattern 50 can be imaged on the target surface in such a way that no two light beams are from amplifiers driven by the same light source and hence any adjacent light beams are mutually incoherent. Any array pixel corresponding to the intersection and overlap of two projected near field patterns will experience temporal modulation at a frequency greater than its bandwidth, and will hence integrate the signal. Each light beam can cover multiple pixels on a receiving detector.

FIG. 4 illustrates an exemplary side-by-side non-overlapping wavelength light beam pattern 55 employing two mutually incoherent sources. Each mutually incoherent source provides a set of sixteen coherent light beams that are mutually incoherent with light beams in the other light beam set. In the example of FIG. 4, the two mutually incoherent sources provide two different wavelength beams v1 and v2.

FIG. 5 illustrates another exemplary scanned side-by-side non-overlapping wavelength light beam pattern 60 employing four mutually incoherent sources. Each mutually incoherent source provides a set of eight coherent light beams that are mutually incoherent with light beams in the other light beam set. The light beams from two sources can be combined to provide a first combined light beam of a combined wavelength of v1 and v2 with the light beams from the other two sources combined to provide a second combined light beam of a combined wavelength of v3 and v4. Each combined light beam can cover twice as many pixels of a receiving detector, as the light beams illustrated in FIGS. 3-4.

It is to be appreciated that with as few as four source frequencies there is considerable flexibility in mapping the emitters to the target such that two beams of the same frequency but differing phase do not interfere. Two source frequencies still provides for linear configurations.

Figure 6:
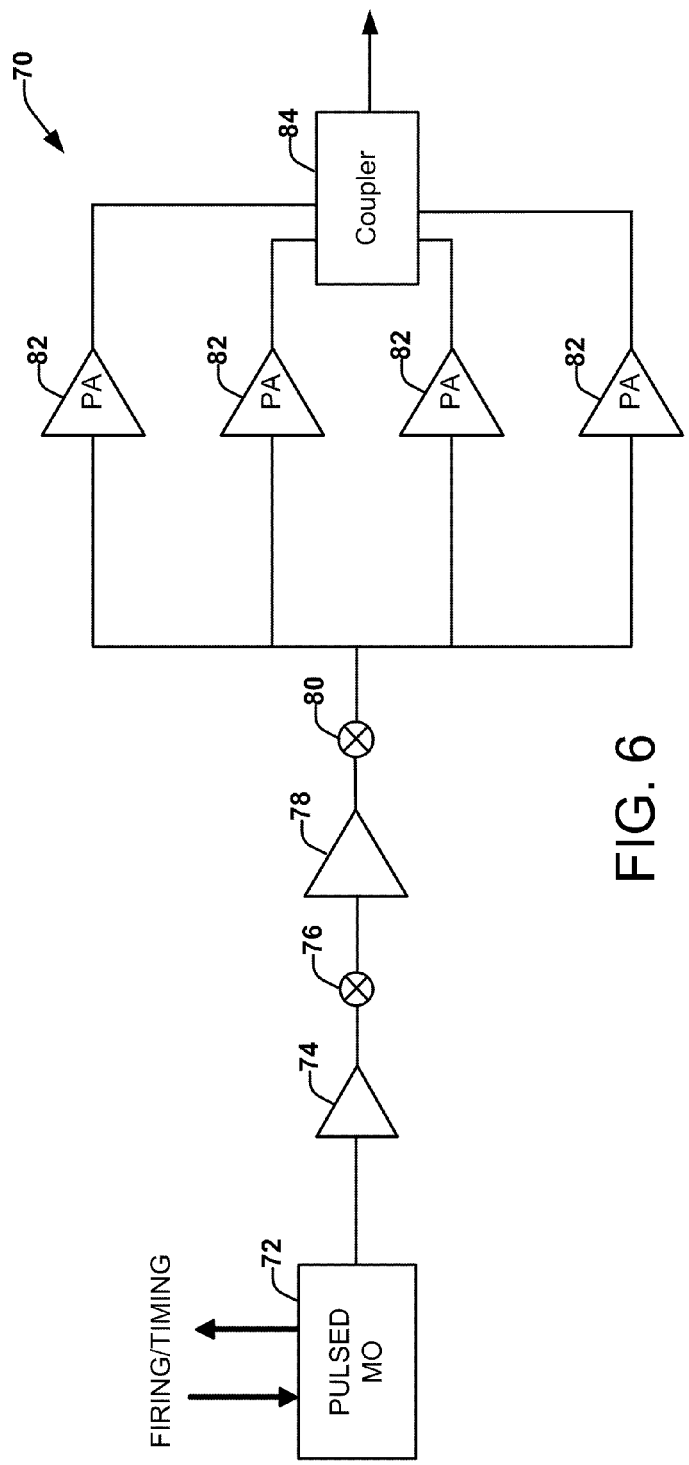
FIG. 6 illustrates a block diagram of an exemplary light source in accordance with an aspect of the present invention.

FIG. 6 illustrates a block diagram of an exemplary light source 70 in accordance with an aspect of the present invention. The exemplary light source 70 is a four pulsed fiber transmitter module. The exemplary light source 70 can be employed in the system of FIG. 1 with other exemplary light sources having MOs that transmit at slightly different wavelengths, such that all light sources are mutually incoherent. The MO signal can be generated using a low level source such as a distributed feed-back (DFB) laser diodes, and modulated by a pulsed amplitude modulator. The pulsed signal from the modulator is amplified by a high gain preamplifier 74, transmitted through an optical isolator 76, driven by a drive amplifier 78, transmitted through an optical isolator 80 and divided by a distribution network among the multiple fiber amplifier lines. The pulsed signal on each line can be further amplified to the final level through preamplifiers (not shown), driver amplifiers (not shown) and power amplifiers 82, all appropriately isolated as required to avoid the deleterious effects of optical feedback. The output signals of the power amplifiers 80 are each provided to a respective transport fiber 84, as illustrated in FIG. 1.

Figure 7:
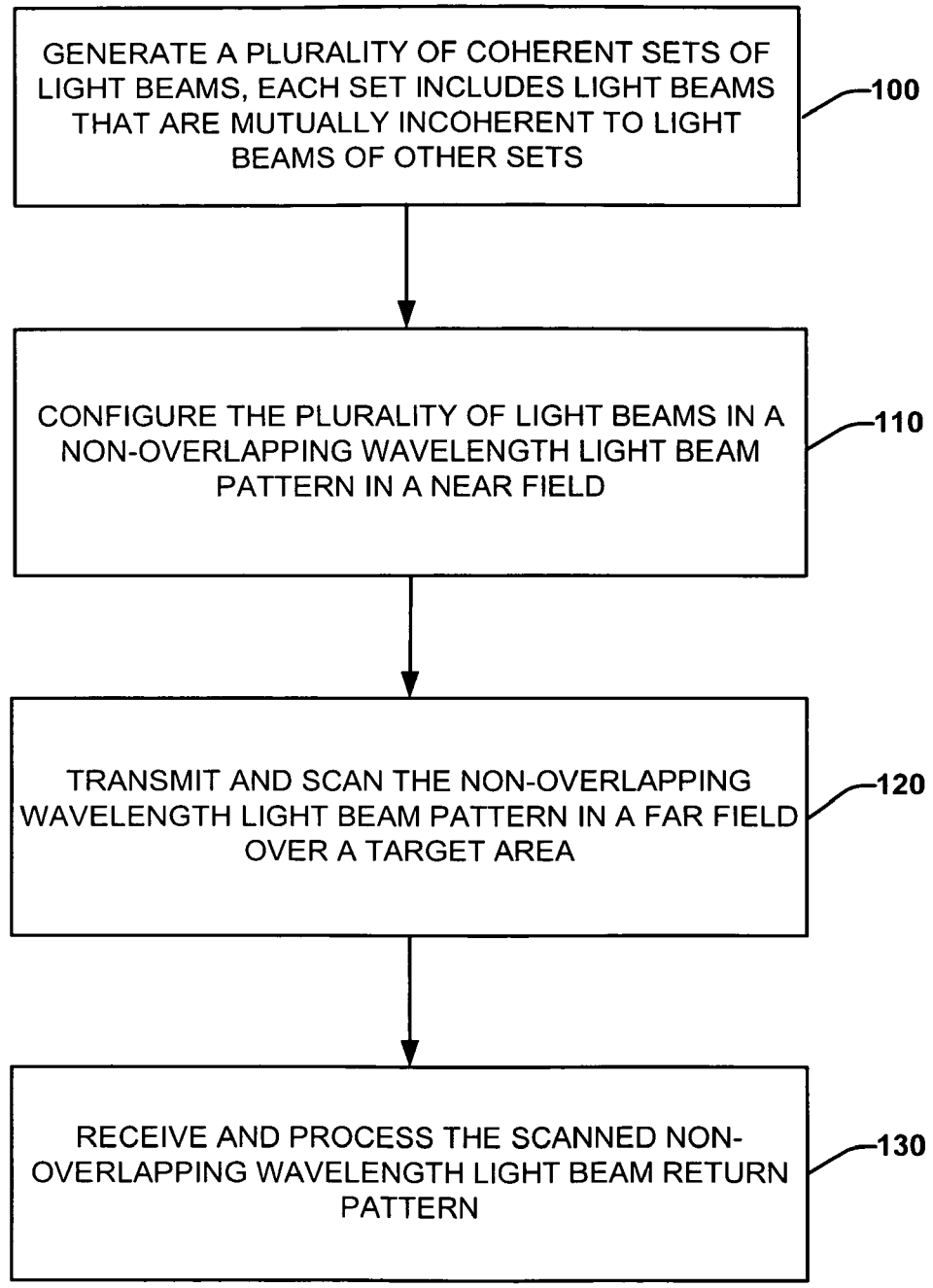
FIG. 7 illustrates a methodology for uniform illumination of a target area in accordance with an aspect of the present invention.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates a methodology for uniform illumination of a target area in accordance with an aspect of the present invention. The methodology begins at 100 where a plurality of coherent sets of light beams are generated, such that each set includes light beams that are mutually incoherent to light beams of other sets. The plurality coherent sets of light beams can be pulsed laser beams. At 110, the plurality of light beams are configured in a non-overlapping wavelength light beam pattern in the near field. The plurality of light beams may be remapped from a circular Gaussian profile to substantially near uniform rectangles that can approach 6th to 9th order Super Gaussians. At 120, the non-overlapping wavelength light beam pattern is transmitted and scanned in the far-field over a target area, for example, in a whisk pattern. At 130, the scanned non-overlapping wavelength beam return pattern is received and processed.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A system for uniform illumination of a target area, the system comprising:
   a plurality of mutually incoherent light sources configured to generate respective light beams with different wavelengths; and
   transmitting optics configured to transmit the light beams with different wavelengths in a checkered non-overlapping wavelength light beam pattern over the target area, such that the light beam pattern comprises a plurality of projections for each of the light beams and that there are no overlap regions of the plurality of projections on the target area illuminated by a light beam from the same light source.

2. The system of claim 1, wherein the transmitting optics is further configured to scan the non-overlapping wavelength light beam pattern over the target area to provide a scanned non-overlapping wavelength light beam pattern and further comprising receiving optics configured to capture and process a scanned non-overlapping wavelength return light beam pattern.

3. The system of claim 2, wherein the wavelengths of the plurality of mutually incoherent light sources fall within the bandwidth of an optical background filter of the receiving optics.

4. The system of claim 1, wherein each of the plurality of the mutually incoherent light sources comprises a master oscillator configured to provide time synchronized pulses and at least one fiber amplifier that amplifies the time synchronized pulses to a desired energy level.

5. The system of claim 4, further comprising a distribution network associated with each of the plurality of mutually incoherent light sources, each distribution network divides the time synchronized pulses between a plurality of fiber amplifiers, each fiber amplifier amplifies the time synchronized pulses to provide a coherent set of light beams, such that each set of light beams includes light beams that are mutually incoherent to light beams of each other set.

6. The system of claim 1, further comprising a reformatting optics lens configured to remap a circular Gaussian profile of the light beams provided by the plurality of mutually incoherent light sources to substantially near uniform rectangular light beams.

7. The system of claim 6, further comprising a collimation and spatial filter located between the plurality of mutually incoherent light sources and the reformatting optics lens, the collimation and spatial filter being configured to remove Gaussian fallout at edges of the light beams and to pass the peak intensity of the light at the center of the light beams.

8. The system of claim 7, further comprising a plurality of transport fibers coupled to respective light sources on first ends and fused to the collimation and spatial filter on second ends in a pattern that provides the non-overlapping wavelength light beam pattern.

9. The system of claim 1, the non-overlapping wavelength light beam pattern being a plurality of non-overlapping light beam pairs arranged in a side-by-side relationship.

10. The system of claim 1, the non-overlapping wavelength light beam pattern comprising a first combined light beam from a first plurality of mutually incoherent light sources and a second combined light beam from a second plurality of mutually incoherent light sources, the first and second combined light beams being arranged in a side-by-side relationship over the non-overlapping wavelength beam pattern.

11. A system for uniform illumination of a target area, the system comprising:
- a plurality of means for generating respective light beams with different wavelengths; means for remapping a circular Gaussian profile of the light beams provided by the plurality of mutually incoherent light sources to substantially near uniform rectangular light beams;
- means for removing Gaussian fallout at edges of the light beams and to pass the peak intensity of the light at the center of the light beams; and
- means for transmitting the light beams with different wavelengths in a non-overlapping wavelength light beam pattern over the target area, such that the light beam pattern comprises a plurality of projections for each of the light beams and that there are no overlap regions of the plurality of projections on the target area illuminated by a light beam from the same light source.

12. The system of claim 11, further comprising means for scanning the non-overlapping wavelength light beam pattern over the target area to provide a scanned non-overlapping wavelength light beam pattern and further comprising means for capturing and processing a scanned non-overlapping wavelength return light beam pattern.

13. The system of claim 11, wherein each of the plurality of means for generating light beams is configured to provide a coherent set of light beams, such that each set includes light beams that are mutually incoherent to light beams in other sets.

14. A method for uniform illumination of a target area, the method comprising:
- generating light beams with different wavelengths from a plurality of mutually incoherent light sources;
- configuring the light beams in a non-overlapping wavelength light beam pattern in a near field; and
- transmitting the light beams with different wavelengths from transmitting optics in a checkered non-overlapping wavelength light beam pattern over the target area in a far field, such that the light beam pattern comprises a plurality of projections for each of the light beams and that there are no overlap regions of the plurality of projections on the target area illuminated by a light beam from the same light source.

15. The method of claim 14, further comprising scanning the non-overlapping wavelength light beam pattern over the target area to provide a scanned non-overlapping wavelength light beam pattern and further comprising means for capturing and processing a scanned non-overlapping wavelength return light beam pattern.

16. The method of claim 14, further comprising:
- removing Gaussian fallout at edges of the light beams and passing the peak intensity of the light at the center of the light beams; and
- remapping a circular Gaussian profile of the light beams to substantially near uniform rectangular light beams.

17. The method of claim 14, the non-overlapping wavelength light beam pattern being pairs of light beams arranged in a side-by-side relationship.

18. The method of claim 14, the non-overlapping wavelength light beam pattern being arranged in a checkered non-overlapping wavelength beam pattern.

19. The method of claim 14, wherein the generating light beams with different wavelengths further comprises generating coherent set of light beams for each different wavelength, such that each set includes light beams that are mutually incoherent to light beams in other sets.

20. A system for uniform illumination of a target area, the system comprising:
- a plurality of mutually incoherent light sources configured to generate respective light beams with different wavelengths and comprising:
  - a master oscillator configured to provide time synchronized pulses; and
  - at least one fiber amplifier that amplifies the time synchronized pulses to a desired energy level; and
- transmitting optics configured to transmit the light beams with different wavelengths in a non-overlapping wavelength light beam pattern over the target area, such that the light beam pattern comprises a plurality of projections for each of the light beams and that there are no overlap regions of the plurality of projections on the target area illuminated by a light beam from the same light source.

* * * * *